United States Patent Office 3,476,773
Patented Nov. 4, 1969

3,476,773
3,14β,17 - TRISOXYGENATED 13β - ALKYL-11,14α-EPOXY-8, 14-SECOGONA-1,3,5(10),8-TETRAENES
John S. Baran, Morton Grove, Ill., assignor to G. D. Searle & Co., Chicago, Ill., a corporation of Delaware
No Drawing. Filed Aug. 28, 1967, Ser. No. 663,527
Int. Cl. C07d *101/00;* A61k *17/00*
U.S. Cl. 260—346.2                                    9 Claims

ABSTRACT OF THE DISCLOSURE 3,14β,17-trisoxygenated 13β-alkyl - 11,14α - epoxy-8,14-secogona-1,3,5(10),8-tetraenes useful as hypocholesterolemic and anti-inflammatory agents and preparable by peroxidation of the corresponding 3-alkoxy-13β-alkyl-8,14-secogona - 1,3,5(10),9(11)-tetraene-14,17-diones followed by etherification of the 14β-hydroxy group, reduction to the 17-hydroxy substances and acylation to afford the corresponding 17-esters.

---

The present invention is concerned with novel chemical compounds characterized by an epoxy function and, more particularly, with 3,14β,17-trisoxygenated 13β - alkyl - 11, 14α - epoxy-8,14-secogona-1,3,5(10),8-tetraenes represented by the following structural formula

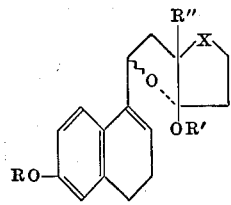

wherein R and R" are lower alkyl radicals, R' can be hydrogen or a lower alkyl radical, X can be a carbonyl, hydroxymethylene or (lower alkanoyl)oxymethylene radical, and the wavy line indicates the alternative α and β stereochemical configurations.

The lower alkyl radicals symbolized by R, R' and R" in the foregoing structural representation are typified by methyl, ethyl, propyl, butyl, pentyl, hexyl, heptyl, and the branched-chain isomers thereof.

The lower alkanoyl radicals encompassed by the X term are represented by the formula

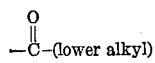

wherein the lower alkyl radicals are as above exemplified.

Manufacture of the compounds of this invention is conveniently accomplished by means of processes which utilize as starting materials substances of the following structural formula

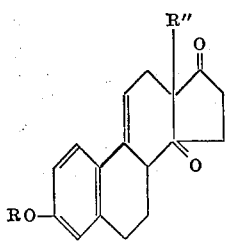

wherein R and R" are as hereinbefore defined.

Oxidation of those starting materials with a suitable peracid, e.g. peracetic acid, perbenzoic, perphthalic acid, metachloroperbenzoic acid, result in concomitant formation of the 11,14α-epoxy function and rearrangement of the 9(11) unsaturated linkage to the 8(9) position, thus producing the instant 13β-alkyl-3-alkoxy-11,14α-epoxy-14β-hydroxy-8,14-secogona-1,3,5(10),8-tetraen-17-ones of the following structural formula

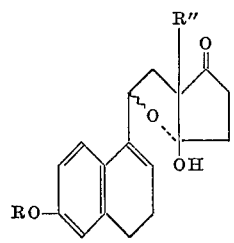

wherein R, R" and the wavy line are as hereinbefore defined. That process is preferably conducted in a suitable organic solvent medium, e.g. chloroform, carbon tetrachloride, methylene chloride, benzene, ether, etc., at a temperature somewhat below room temperature. Illustrative of that process is the reaction of 3-methoxy-8,14-secoestra - 1,3,5(10),9(11) - tetraene - 14,17 - dione with metachloroperbenzoic acid in chloroform at about 10°, thus affording *dl*-14β-hydroxy - 3 - methoxy-11,14α-epoxy-8,14-secoestra-1,3,5(10),8-tetraen-17-one.

The 14β-hydroxy group of the instant compounds is readily convertible to an ether function by reaction with a lower alkanol, preferably in the presence of a suitable acid catalyst such as p-toluenesulfonic acid. Reaction of the aforementioned *dl*-14β-hydroxy - 3 - methoxy-11,14α-epoxy-8,14-secoestra - 1,3,5(10),8 - tetraen - 17 - one with methanol and p-toluenesulfonic acid at room temperature thus affords *dl*-11,14α-epoxy-3,14β-dimethoxy-8,14-secoestra-1,3,5(10),8-tetraen-17-one.

Reduction of the instant 17-keto compounds with a suitable reagent such as lithium tri-(tertiary-butoxy) aluminum hydride affords an epimeric mixture of the 17α- and 17β-hydroxy isomers, in which mixture the 17β-isomer predominates. The individual isomers are separated and isolated by crystallization and chromatographic techniques. When *dl*-11,14α-epoxy-3,14β-dimethoxy-8,14-secoestra-1,3,5(10),8-tetraen-17-one is allowed to react with lithium tri-(tertiary-butoxy) aluminum hydride in tetrahydrofuran at room temperature, there is produced *dl*-11,14α - epoxy-3,14β-dimethoxy-8,14-secoestra-1,3,5(10), 8-tetraen-17-ol which, upon recrystallization, affords the predominant 17β isomer.

The 17-(lower alkanoates) of this invention are obtained upon reaction of the corresponding 17-hydroxy substances with a lower alkanoic acid anhydride or halide, preferably in the presence of a suitable acid acceptor such as pyridine or triethylamine. The aforementioned *dl*-11, 14α-epoxy - 3,14β - dimethoxy-8,14-secoestra-1,3,5(10),8-tetraen-17β-ol, upon reaction with acetic anhydride and pyridine, thus affords *dl*-11,14α-epoxy - 3,14β - dimethoxy-8,14-secoestra-1,3,5(10),8-tetraen-17β-ol 17-acetate.

The instant compounds are obtained in the form of *dl*-mixtures. Resolution to afford the individual d and l enantiomorphs is conveniently effected by esterification of the hydroxy group or groups with a dibasic acid anhydride such as succinic or phthallic anhydride to afford the corresponding acid ester followed by salt formation with a suitable optical active amine such as brucine, morphine, quinine, quinidine, or strychnine, separation of the resulting diastereomeric salts by fractional crystallization, regeneration of the individual d and l acid esters and hydrolysis to afford the instant d and l hydroxy compounds.

The novel compounds of this invention are useful as a result of their valuable pharmacological properties. They possess, for example, hypocholesterolemic and anti-inflammatory activity. These substances can be administered in any of a number of conventional pharmaceutical forms and also be conventional routes. For oral administration suitable solid forms are pills, powders, capsules, tablets, and the like, and suitable liquid forms are syrups, emulsions, elixers, suspensions, and the like. For parenteral administration these compounds can be dispersed in an aqueous suspension or dissolved in a pharmacologically acceptable oil or oil-water emulsion. Suitable excepients can also be added.

The pharmacological activity of the novel compounds of this invention is specifically illustrated by the anti-inflammatory activity of $dl$-11,14α-epoxy-14β-hydroxy-3-methoxy-8,14 - secoestra - 1,3,5(10),8 - tetraen - 17 - one. This compound was assayed in the rat at an intragastrically administered dose of 20 mg. for two successive days and was found effective in inhibiting the granuloma formation induced by the subcutaneous implantation of cotton wads.

The specific assay used is a modification of that disclosed by Dulin, Proc. Soc. Exp. Biol. Med., 90, 115 (1955) and is described as follows:

Male rats weighing 180-220 g. are adrenalectomized and arranged into groups of six animals each. The animals are maintained on 0.86% saline drinking water for the duration of the test and are supplemented with 5% aqueous glucose for the first 24 hours following adrenalectomy. On the day following the operation, four cotton dental pellets, with an average weight of approximately 6 mg., are individually implanted in a bi-lateral position in the pectoral and dorsal lateral neck regions of each rat. The test compound, dissolved or suspended in a saline-wetting agent mixture or in corn oil, is administered by stomach tube on the day of the pellet implantation and the treatment is repeated on the following day. On the day following the last treatment the rats are sacrificed and the pellets with associated granuloma tissue are carefully dissected, dried and weighed. These weights are compared with those from a group of control animals concurrently treated as above save for omission of the test compound. The test compound is rated active if it causes a significant decrease ($P<0.05$) in the weight of encapsulated tissues surrounding the cotton pellets.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (° C.). Quantities are expressed in parts by weight unless otherwise noted.

EXAMPLE 1

To a solution of 1.5 parts of 3-methoxy-8,14-secoestra-1,3,5(10),9(11)-tetraene-14,17-dione in 75 parts of chloroform cooled to about 10°, is added a solution of one part of meta-chloroperbenzoic acid in 30 parts of chloroform. After that mixture is allowed to react for about 15 minutes, it is washed with aqueous potassium carbonate, then dried over anhydrous magnesium sulfate and distilled to dryness under reduced pressure. Trituration of the resulting crude product with a mixture of ether and hexane affords a colorless crystalline substance, which is further purified by recrystallization from acetone-hexane, thus affording pure $dl$-11,14α-epoxy-14β-hydroxy - 3 - methoxy-8,14-secoestra-1,3,5(10),8-tetraen-17-one, melting at about 156–157°. It is represented by the following structural formula

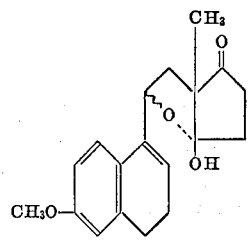

EXAMPLE 2

When an equivalent quantity of 3 - ethoxy - 8,14-secoestra-1,3,5(10),9(11)-tetraene-14,17-dione is substituted in the procedure of Example 1, there is produced $dl$-11,14α - epoxy - 3 - ethoxy - 14β - hydroxy - 8,14-secoestra-1,3,5(10),8-tetraen-17-one.

EXAMPLE 3

A mixture containing 1 part of $dl$-11,14α-epoxy-14β-hydroxy - 3 - methoxy - 8,14 - secoestra - 1,3,5(10),8-tetraen-17-one, 0.1 part of p-toluenesulfonic acid and 16 parts of methanol is stored at room temperature for about 16 hours, then is diluted with chloroform. That organic solution is washed with saturated aqueous sodium bicarbonate, dried over anhydrous magnesium sulfate and distilled to dryness under reduced pressure to afford $dl$-11,14α - epoxy - 3,14β - dimethoxy - 8,14 - secoestra-1,3,5(10),8-tetraen-17-one. This compound is characterized by infrared absorption maxima at about 3.39, 5.70 and 6.21 microns and is represented by the following structural formula

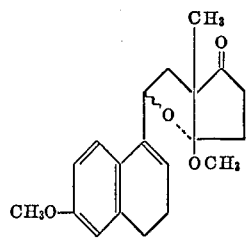

EXAMPLE 4

When an equivalent quantity of ethanol is substituted for methanol in the procedure of Example 3, there is obtained $dl$-11,14α-epoxy-14β-ethoxy - 3 - methoxy - 8,14-secoestra-1,3,5(10),8-tetraen-17-one.

EXAMPLE 5

To a solution of one part of $dl$ - 11,14α - epoxy-3,14β-dimethoxy - 8,14 - secoestra - 1,3,5(10),8 - tetraen-17-one in 90 parts of tetrahydrofuran is added one part of lithium tri - (tertiary-butoxy) aluminum hydride, and that reaction mixture is stirred at room temperature for about 15 minutes. The solution is concentrated to a small volume, then is partitioned between ether and saturated aqueous sodium potassium tartrate. The organic layer is separated, washed with saturated aqueous sodium potassium tartrate, dried over anhydrous magnesium sulfate and concentrated to dryness to afford a residue containing $dl$ - 11,14α - epoxy - 8,14 - secoestra - 1,3,5(10),8-tetraene - 3,14β,17β - triol 3,14 - dimethyl ether. That residue is dissolved in a mixture of 3 parts of acetic anhydride and 6 parts of pyridine, then is warmed for about 30 minutes at steam bath temperature. After standing at room temperature for about 16 hours, that solution is stirred with an ice-water mixture, then partitioned between benzene and dilute hydrochloric acid. The benzene layer is separated, washed several times with dilute hydrochloric acid, then with water and dilute aqueous sodium bicarbonate. Drying over anhydrous magnesium sulfate followed by distillation of the organic solution to dryness affords the crude product. Recrystallization from methanol affords crystals of pure dl-11,14α-epoxy - 3,14β - dimethoxy - 8,14 - secoestra - 1,3,5(10), 8 - tetraen - 17β - ol 17 - acetate, melting at about 88–91°. This compound is characterized further by infrared absorption maxima, in a potassium bromide disc, at about 5.78 and 6.22 microns and also by the following structural formula

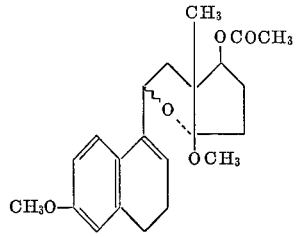

EXAMPLE 6

When equivalent quantities of dl - 11,14α - epoxy - 3-ethoxy - 14β - hydroxy - 8,14 - secoestra - 1,3,5(10),8-tetraen - 17 - one and ethanol are allowed to react according to the procedure described in Example 3, there is produced dl - 11,14α - epoxy - 3,14β - diethoxy - 8,14-secoestra - 1,3,5(10),8-tetraen-17-one.

EXAMPLE 7

The substitution of an equivalent quantity of dl - 11,14α - epoxy - 3,14β - diethoxy - 8,14 - secoestra - 1,3,5(10),8 - tetraen - 17 - one in the procedure of Example 5 results in dl - 11,14α - epoxy - 8,14 - secoestra-1,3,5(10),8 - tetraene - 3,14,17β - triol 3,14 - diethyl ether.

EXAMPLE 8

The reaction of equivalent quantities of dl - 11,14α-epoxy - 8,14 - secoestra - 1,3,5(10),8 - tetraene-3,14β, 17β - triol 3,14 - diethyl ether and propionic anhydride according to the procedure described in Example 5 results in dl - 11,14α - epoxy - 3,14β - diethoxy - 8,14-secoestra - 1,3,5(10),8-tetraen-17β-ol 17-propionate.

What is claimed is:
1. A compound of the formula

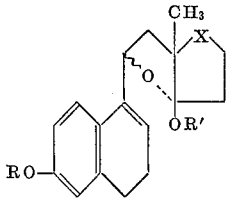

wherein R is a lower alkyl radical, R' is selected from the group consisting of hydrogen and a lower alkyl radical and X is a member of the class consisting of carbonyl, hydroxymethylene and (lower alkanoyl)oxymethylene radicals.

2. As in claim 1, a compound of the formula

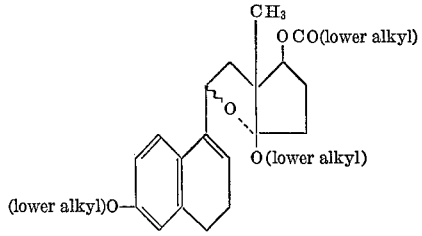

3. As in claim 1, a compound of the formula

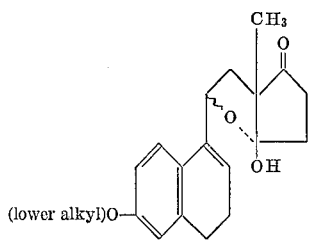

4. As in claim 1, a compound of the formula

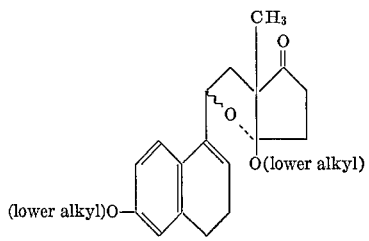

5. As in claim 1, a compound of the formula

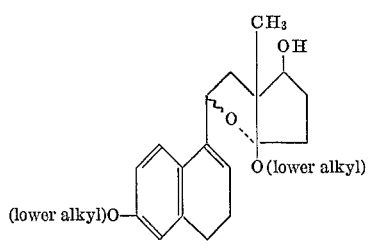

6. As in claim 1, the compound which is dl - 14β - hydroxy - 11,14α - epoxy - 3 - methoxy - 8,14 - secoestra-1,3,5(10),8-tetraen-17-one.

7. As in claim 1, the compound which is dl - 11,14α-epoxy - 3,14β - dimethoxy - 8,14 - secoestra - 1,3,5(10), 8-tetraen-17-one.

8. As in claim 1, the compound which is dl - 11,14α-epoxy - 8,14 - secoestra - 1,3,5(10),8 - tetraene-3,14β, 17β-triol 3,14-dimethyl ether.

9. As in claim 1, the compound which is dl - 11,14α-epoxy - 3,14β - dimethoxy - 8,14 - secoestra - 1,3,5(10), 8-tetraen-17β-ol 17-acetate.

References Cited

Chemical Abstracts—Rufer et al., 105090v, vol. 66 (1967).

ALEX MAZEL, Primary Examiner

BERNARD I. DENTZ, Assistant Examiner

U.S. Cl. X.R.

424—285

PO-1050
(5/64)

UNITED STATES PATENT OFFICE
CERTIFICATE OF CORRECTION

Patent No. 3,476,773         Dated  November 4, 1969

Inventor(s)   John S. Baran

It is certified that error appears in the above-identified patent and that said Letters Patent are hereby corrected as shown below:

Column 1, third formula

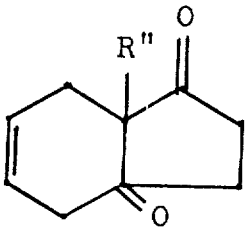

should be

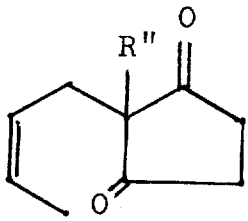

cf. Page 2, second formula

Signed and sealed this 17th day of February 1970.

(SEAL)
Attest:

EDWARD M. FLETCHER, JR.
Attesting Officer

WILLIAM E. SCHUYLER, JR.
Commissioner of Patents